US009906142B2

(12) United States Patent
Yang et al.

(10) Patent No.: US 9,906,142 B2
(45) Date of Patent: Feb. 27, 2018

(54) RESONANT CONVERTING APPARATUS AND CONTROL METHOD THEREOF

(71) Applicants: LITE-ON ELECTRONICS (GUANGZHOU) LIMITED, Guangzhou (CN); Lite-On Technology Corporation, Taipei (TW)

(72) Inventors: Te-Hong Yang, New Taipei (TW); Ming-Tsung Hsieh, New Taipei (TW); Yu-Kang Lo, New Taipei (TW)

(73) Assignees: LITE-ON ELECTRONICS (GUANGZHOU) LIMITED, Guangzhou (CN); Lite-On Technology Corporation, Taipei (TW)

( * ) Notice: Subject to any disclaimer, the term of this patent is extended or adjusted under 35 U.S.C. 154(b) by 0 days.

(21) Appl. No.: 15/246,567

(22) Filed: Aug. 25, 2016

(65) Prior Publication Data

US 2018/0019679 A1 Jan. 18, 2018

(30) Foreign Application Priority Data

Jul. 13, 2016 (CN) .......................... 2016 1 0555594

(51) Int. Cl.

*H02M 3/335* (2006.01)
*H02M 1/08* (2006.01)
*H02M 1/00* (2006.01)

(52) U.S. Cl.

CPC ......... *H02M 3/33507* (2013.01); *H02M 1/08* (2013.01); *H02M 2001/0009* (2013.01)

(58) Field of Classification Search

CPC ........ H02M 3/325; H02M 3/335; H02M 3/28; H02M 3/33569; H02M 2007/4815;

(Continued)

(56) References Cited

U.S. PATENT DOCUMENTS

2009/0219070 A1* 9/2009 Zhang ................. H02M 3/3376 327/162
2015/0288291 A1* 10/2015 Han ...................... H02M 3/337 363/17

FOREIGN PATENT DOCUMENTS

| | | |
|---|---|---|
| TW | 556395 | 10/2003 |
| TW | I380569 | 12/2012 |
| TW | I469489 | 1/2015 |

OTHER PUBLICATIONS

"Office Action of Taiwan Counterpart Application," dated Apr. 11, 2017, p. 1-p. 7, in which the listed references were cited.

* cited by examiner

*Primary Examiner* — Kyle J Moody
*Assistant Examiner* — Afework Demisse
(74) *Attorney, Agent, or Firm* — JCIPRNET

(57) ABSTRACT

A resonant converting apparatus and a control method thereof are provided. The resonant converting apparatus includes a resonant converting circuit, a load detector, a control signal generator and a pulse frequency modulation (PFM) signal generator. The resonant converting circuit converts an input voltage into an output voltage to drive a load according to a PFM signal. The load detector detects a load status of the load. The control signal generator generates the control signal according to the load status and a PFM range. When the load status is a light load status, the control signal is divided into a plurality of first time periods and second time periods which are respectively arranged alternatively. The PFM signal is maintained to a reference voltage during the second time periods, and is a periodical signal having frequency substantially equal to a resonant frequency during the first time periods.

19 Claims, 8 Drawing Sheets

(58) Field of Classification Search
CPC ......... H02M 2007/4818; H02M 1/083; H02M 3/33507; H02M 2001/0009; H02M 1/08
See application file for complete search history.

RESONANT CONVERTING APPARATUS AND CONTROL METHOD THEREOF

CROSS-REFERENCE TO RELATED APPLICATION

This application claims the priority benefit of China application serial no. 201610555594.1, filed on Jul. 13, 2016. The entirety of the above-mentioned patent application is hereby incorporated by reference herein and made a part of this specification.

BACKGROUND OF THE INVENTION

Field of the Invention

The invention relates to a resonant converting apparatus and a control method thereof, and particularly relates to a resonant converting apparatus and a control method thereof capable of improving power conversion efficiency under a light load status.

Description of Related Art

Along with development of electronic science and technology, electronic apparatuses have become important tools in people's daily life. In order to make the electronic apparatus to satisfy the need of multi-function, the electronic apparatus generally requires a plurality of different power supplies, so that a power converter becomes an important device in the electronic apparatus.

Regarding a conventional series resonant converter, a working state thereof has optimal efficiency when a switching frequency of a switch thereof is close to a resonant frequency provided by a resonant trough in the series resonant converter. However, in an actual practise, when a load of the series resonant converter is decreased, a required output current is decreased. Therefore, in order to produce a stable output voltage, the switching frequency of the switch of the series resonant converter is raised, and the switching frequency of the switch is away from the resonant frequency provided by the resonant trough, which decreases of the power conversion efficiency.

SUMMARY OF THE INVENTION

The invention is directed to a resonant converting apparatus and a control method thereof, which effectively improve power conversion efficiency under a light load status.

The invention provides a resonant converting apparatus including a resonant converting circuit, a load detector, a control signal generator and a pulse frequency modulation (PFM) signal generator. The resonant converting circuit receives an input voltage, and converts the input voltage to produce an output voltage according to a PFM signal, and the resonant converting circuit provides the output voltage to drive a load. The load detector is coupled to the resonant converting circuit, and detects a load status of the load. The control signal generator is coupled to the load detector and the resonant converting circuit, and generates a control signal according to the load status and a PFM range. The PFM signal generator is coupled between the control signal generator and the resonant converting circuit, and generates the PFM signal according to the control signal. When the load status is a light load status, the control signal generator divides the control signal into a plurality of first time periods and a plurality of second time periods according to the PFM range, where the first time periods and the second time periods are arranged alternatively, and the PFM signal generator keeps the PFM signal at a reference voltage during the second time periods, and sets the PFM signal to a periodical signal having frequency substantially equal to a resonant frequency during the first time periods.

In an embodiment of the invention, the control signal generator detects a current demand of the load to obtain the load status.

In an embodiment of the invention, the control signal generator determines the load status to be the light load status when the current demand is smaller than a predetermined threshold.

In an embodiment of the invention, the control signal generator adjusts time lengths of the first time periods and the second time periods according to a variation of the current demand when the load status is the light load status.

In an embodiment of the invention, the current demand is positively correlated to the time length of each of the first time periods.

The invention provides a control method of a resonant voltage converter, which includes following steps: detecting a load status of a load driven by the resonant voltage converter; generating a control signal according to the load status and a PFM range; generating a PFM signal according to the control signal, where when the load status is a light load status, the control signal is divided into a plurality of first time periods and a plurality of second time periods according to the PFM range, and the first time periods and the second time periods are arranged in alternation, and the PFM signal is maintained to a reference voltage during the second time periods, and is a periodical signal having frequency substantially equal to a resonant frequency during the first time periods; and converting an input voltage to generate an output voltage according to the PFM signal.

According to the above descriptions, under the light load status, the control signal is divided into a plurality of first time periods and a plurality of second time periods, and the resonant conversion circuit does not perform the switching operation during the second time periods under control of the PFM signal, and the PFM signal makes the switch of the resonant converting circuit to substantially perform periodic switching operation during the first time periods according to a corrected resonant frequency. In this way, the frequency of the PFM signal is not away from the resonant frequency, by which the power conversion efficiency of the resonant converting apparatus under the light load status is improved.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
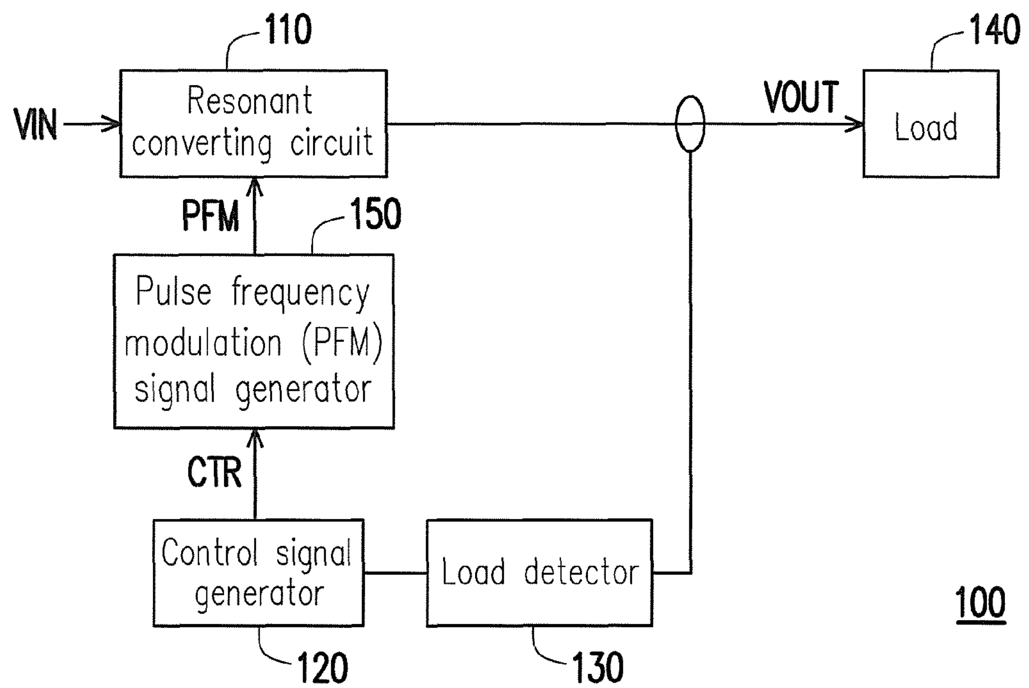
FIG. 1 is a schematic diagram of a resonant converting apparatus according to an embodiment of the invention.

FIG. 1 is a schematic diagram of a resonant converting apparatus according to an embodiment of the invention. Referring to FIG. 1, the resonant converting apparatus 100 includes a resonant converting circuit 110, a load detector 130, a pulse frequency modulation (PFM) signal generator 150 and a control signal generator 120. The resonant converting circuit 110 receives an input voltage VIN, and converts the input voltage VIN to produce an output voltage VOUT according to a control signal CTR. An output terminal of the resonant converting circuit 110 is coupled to a load 140, and provides the output voltage VOUT to drive the load 140. The load detector 130 is coupled to the output terminal of the resonant converting circuit 110, and is configured to detect a load status of the load 140. The load detector 130 may detect a current demand of the load 140 to obtain the load status. Namely, the load detector 130 may obtain the load status by detecting a magnitude of a current value transmitted to the load 140 from the resonant converting circuit 110. Further, the load detector 130 may determine whether a current demand of the load 140 is smaller than a predetermined threshold, and determines the load status to be a light load status when the current demand of the load 140 is smaller than the predetermined threshold.

The control signal generator 120 is coupled to the load detector 130 and PFM signal generator 150. The control signal generator 120 provides the control signal CTR to the PFM signal generator 150 to control generation of a PFM signal PFM of the PFM signal generator 150. The PFM signal generator 150 is coupled to the resonant converting circuit 110, and provides the PFM signal PFM to the resonant converting circuit 110. The resonant converting circuit 110 performs a switching operation of a switch according to the PFM signal PFM, and performs a power conversion operation to convert the input voltage VIN into the output voltage VOUT through the switching operation of the switch.

In view of an operation detail, the control signal generator 120 receives the load status provided by the load detector 130, and the control signal generator 120 adjusts the control signal CTR according to the load status and a PFM range, where the PFM range is determined according to an output voltage feedback signal of the load 140. In the present embodiment, a pulse frequency is a periodical signal having frequency substantially equal to a resonant frequency. It should be noted that when the load status indicates that the current demand of the load 140 is the light load status, in the present embodiment, the control signal generator 120 divides the control signal CTR into a plurality of first time periods and a plurality of second time periods according to the PFM range, where the first time periods and the second time periods are arranged in alternation. The control signal CTR can be held on a first reference voltage during the first time periods, and be held on a second reference voltage during the second time periods, the first reference voltage can be higher than or lower than the second reference voltage.

Moreover, the PFM signal generator 150 receives the control signal CTR, and generates the PFM signal PFM corresponding to the first and second time periods according to the control signal CTR. The PFM signal is a periodical signal during the first time periods, where a frequency of the periodical signal is substantially equal to the resonant frequency of the resonant converting circuit 110, and the PFM signal is held on a reference voltage during the second time periods.

Figure 2:
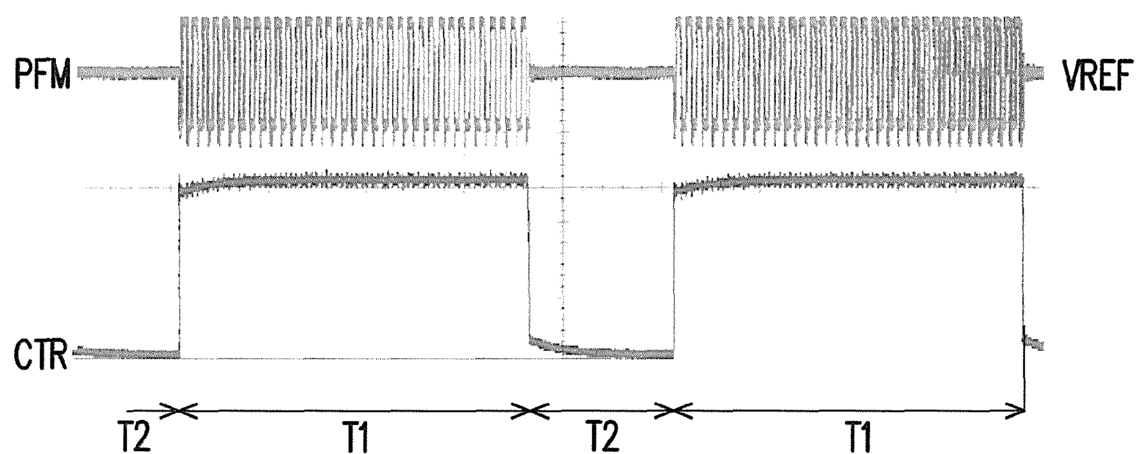
FIG. 2 is a waveform diagram of a resonant converting apparatus according to an embodiment of the invention.

Referring to FIG. 1 and FIG. 2, FIG. 2 is a waveform diagram of a resonant converting apparatus according to an embodiment of the invention. In FIG. 2, the control signal generator 120 adjusts the control signal CTR when the current demand of the load 140 is the light load status, and divides the control signal CTR into a plurality of first time periods T1 and a plurality of second time periods T2, where the first time periods T1 and the second time periods T2 are arranged in alternation along a time axis. Moreover, in the first time periods T1, the control signal CTR is equal to a first reference voltage with a higher voltage level, and in the second time periods T2, the control signal CTR is equal to a second reference voltage with a lower voltage level. On the other hand, the PFM signal generator 150 generates the PFM signal PFM according to the control signal CTR. During the first time periods T1, the PFM signal PFM is equal to the periodical signal, and the frequency of the PFM signal PFM is substantially equal to the resonant frequency provided by a resonant trough of the resonant converting circuit 110. During the second time periods T2, the PFM signal PFM is maintained to be equal to a fixed reference voltage VREF. A voltage value of the reference voltage VREF is not limited, and it should be noted that the switching operation of the switch of the resonant converting circuit 110 is not executed during the second time periods T2.

It should be noted that time lengths of the first time periods T1 and the second time periods T2 are not limited. When the load detector 130 determines that the resonant converting apparatus 100 is in the light load status, the control signal generator 120 may further adjust the time lengths of the first time periods T1 and the second time periods T2 according to a variation of the current demand of the load 140. When the current demand of the load 140 is decreased, the time length of the first time period T1 can be reduced, and the time length of the second tune period T2 can be corresponding increased. Conversely, when the current demand of the load 140 is increased, the time length of the first time period T1 can be increased, and the time length of the second time period T2 can be corresponding reduced. Namely, the time length of the first time period T1 is positively correlated to the current demand of the load 140, and the time length of the second time period T2 is negatively correlated to the current demand of the load 140.

Figure 3A:
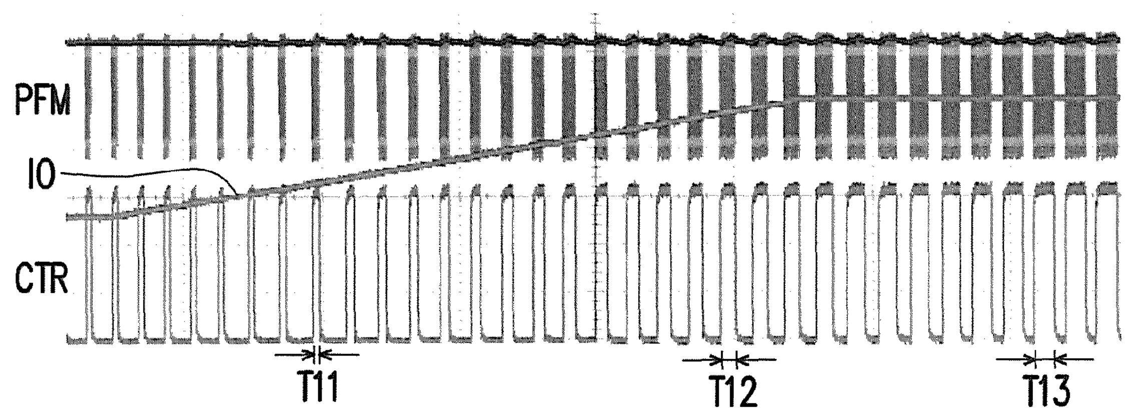
FIG. 3A and FIG. 3B are waveform diagrams of adjusting operations of a control signal performed in response to a current demand.
Figure 3B:
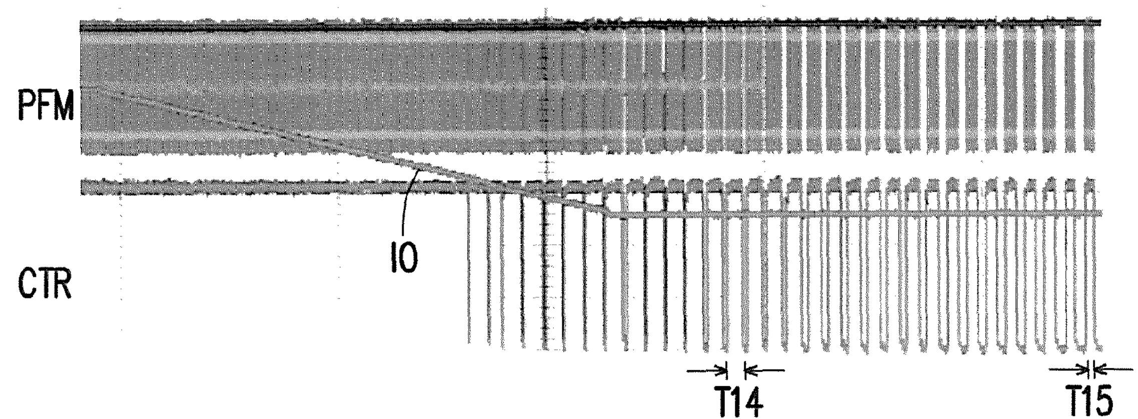

Referring to FIG. 3A and FIG. 3B, FIG. 3A and FIG. 3B are waveform diagrams of adjusting operations of the control signal performed in response to the current demand. In FIG. 3A, the current demand of the load 140 is increased, and an output current IO generated by the resonant converting circuit 110 is required to be increased to stabilize the output voltage VOUT to a setting voltage value. Now, the control signal generator 120 gradually increases the time length of the first time period in response to increase of the output current IO. A time length of a first time period T11 is smaller than a time length of a first time period T12, and the time length of the first time period T12 is smaller than a time length of a first time period T13.

Comparatively, in FIG. 3B, the current demand of the load 140 is decreased, and the output current IO generated by the resonant converting circuit 110 is required to be decreased to stabilize the output voltage VOUT to a setting voltage value. Now, the control signal generator 120 gradually decreases the time length of the first time period in response to decrease of the output current IO. A time length of a first time period T14 is larger than a time length of a first time period T15.

Figure 4:
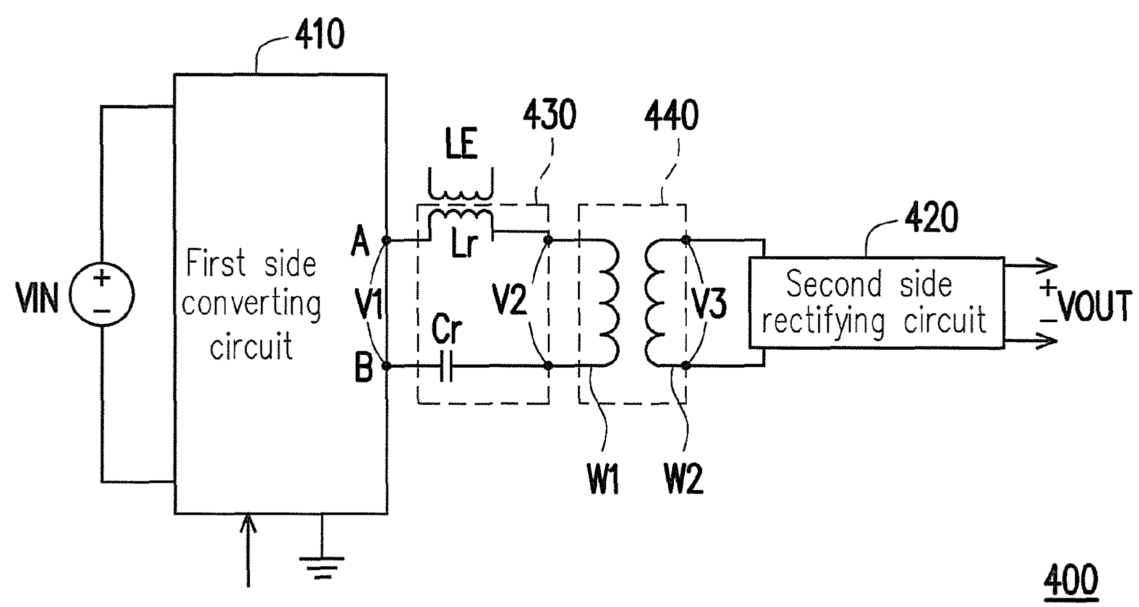
FIG. 4 is a schematic diagram of a resonant converting circuit according to an embodiment of the invention.

Referring to FIG. 4, FIG. 4 is a schematic diagram of a resonant converting circuit according to an embodiment of the invention. The resonant converting circuit 400 includes a first side converting circuit 410, a second side rectifying circuit 420, an inductance capacitance resonant circuit 430 and a transformer 440. The first side converting circuit 410 receives the input voltage VIN and the control signal CTR, and performs a voltage conversion operation on the input voltage VIN to generate a first voltage V1 according to the PFM signal PFM. The inductance capacitance resonant circuit 430 is coupled to the first side converting circuit 410 to receive the first voltage V1, and generates a second voltage V2 according to the first voltage V1. The inductance capacitance resonant circuit 430 can be a circuit consisting of an inductor and a capacitor. In the present embodiment, the inductance capacitance resonant circuit 430 includes an inductor Lr and a capacitor Cr, where the inductor Lr is connected in series between a terminal A of the first side converting circuit 410 and a terminal of a primary side W1 of the transformer 440, and the capacitor Cr is connected in series between a terminal B of the first side converting circuit 410 and another terminal of the primary side W1 of the transformer 440. The transformer 440 receives the second voltage V2 through the primary side W1, and generates a third voltage V3 through a secondary side W2 coupled to the primary side W1.

The second side rectifying circuit 420 is coupled to the secondary side W2 of the transformer 440 to receive the third voltage V3. The second side rectifying circuit 420 rectifies the third voltage V3 to generate the output voltage VOUT.

In the present embodiment, the resonant converting circuit 400 can be a series resonant converting circuit or a series parallel resonant converting circuit, a parallel resonant converting circuit. A resonant trough formed by the inductor Lr and the capacitor Cr in the inductance capacitance resonant circuit 430 provides a resonant frequency. Moreover, the inductor Lr can be coupled to an external inductor LE.

Figure 5A:
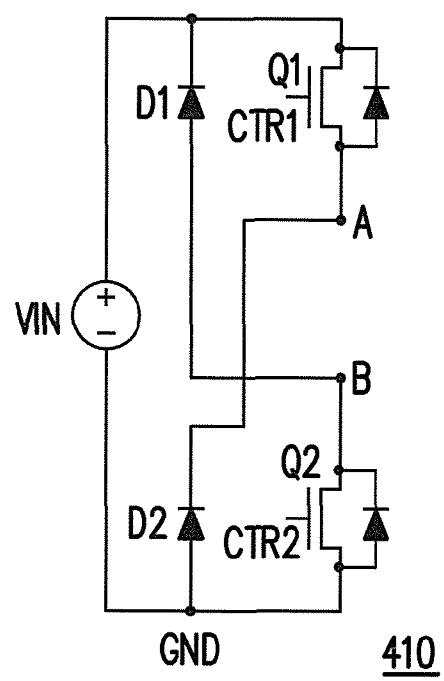
FIG. 5A-FIG. 5C are circuit diagrams of a plurality of implementations of a first side converting circuit.
Figure 5B:
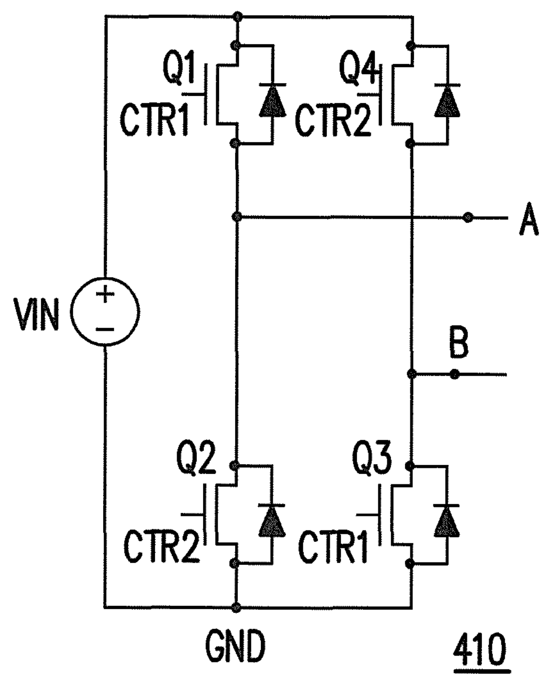
Figure 5C:
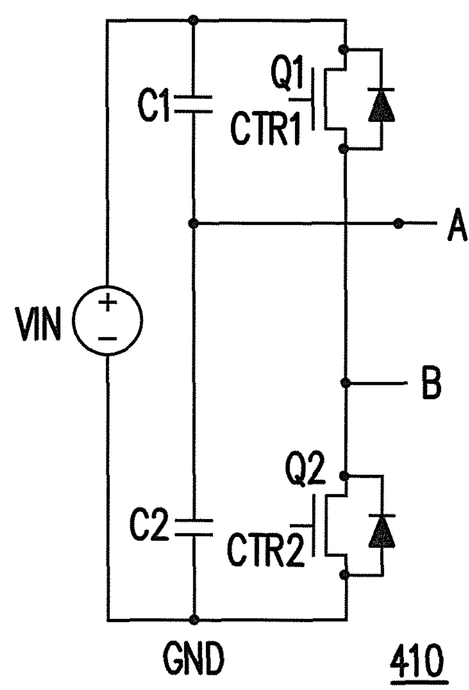

Implementation detail of the first side converting circuit 410 of the present embodiment may refer to FIG. 5A-FIG. 5C, and FIG. 5A-FIG. 5C are circuit diagrams of a plurality of implementations of the first side converting circuit.

Referring to FIG. 5A, the first side converting circuit 440 is a dual switches forward converting circuit, and includes switches constructed by transistors Q1 and Q2 and diodes D1 and D2. A first terminal of the transistor Q1 receives the input voltage VIN, a control terminal thereof receives a first PFM signal PFM1, and a second terminal of the transistor Q1 is coupled to the terminal A, and the transistor Q1 is coupled to the inductance capacitance resonant circuit 430 though the terminal A. A first terminal of the transistor Q2 is coupled to the terminal B, and the transistor Q2 is coupled to the inductance capacitance resonant circuit 430 though the terminal B. A control terminal of the transistor Q2 receives a second PFM signal PFM2, and a second terminal of the transistor Q2 is coupled to a reference ground terminal GND. Moreover, a cathode of the diode D1 is coupled to the first terminal of the transistor Q1, and an anode thereof is coupled to the terminal B, and a cathode of the diode D2 is coupled to the terminal A, and an anode thereof is coupled to the reference ground terminal GND.

The first side converting circuit 440 in FIG. 5B is a full-bridge converting circuit, and includes four switches constructed by transistors Q1-Q4. A first terminal of the transistor Q1 receives the input voltage VIN, a control terminal of the transistor Q1 receives a PFM signal PFM1, and a second terminal of the transistor Q1 is coupled to the terminal A. A first terminal of the transistor Q2 is coupled to the terminal A, a control terminal of the transistor Q2 receives a PFM signal PFM2, and a second terminal of the transistor Q2 is coupled to the reference ground terminal GND. A first terminal of the transistor Q4 receives the input voltage VIN, a control terminal of the transistor Q4 receives the PFM signal PFM2, and a second terminal of the transistor Q4 is coupled to the terminal B. A first terminal of the transistor Q3 is coupled to the terminal B, a control terminal of the transistor Q3 receives the PFM signal PFM1, and a second terminal of the transistor Q3 is coupled to the reference ground terminal GND.

The first side converting circuit 440 in FIG. 5C is a half-bridge converting circuit, and includes switches constructed by a transistor Q1 and a transistor Q2. A first terminal of the transistor Q1 receives the input voltage VIN, a control terminal of the transistor Q1 receives the PFM signal PFM1, and a second terminal of the transistor Q1 is coupled to the terminal B. A first terminal of the transistor Q2 is coupled to the terminal B, a control terminal of the transistor Q2 receives the PFM signal PFM2, and a second terminal of the transistor Q2 is coupled to the reference ground terminal GND.

In the present embodiment, the first side converting circuit 440 further includes capacitors C1 and C2. One terminal of the capacitor C1 receives the input voltage VIN, and another terminal of the capacitor C1 is coupled to the terminal A. The capacitor C2 is connected in series between the terminal A and the reference ground terminal GND.

Figure 6A:
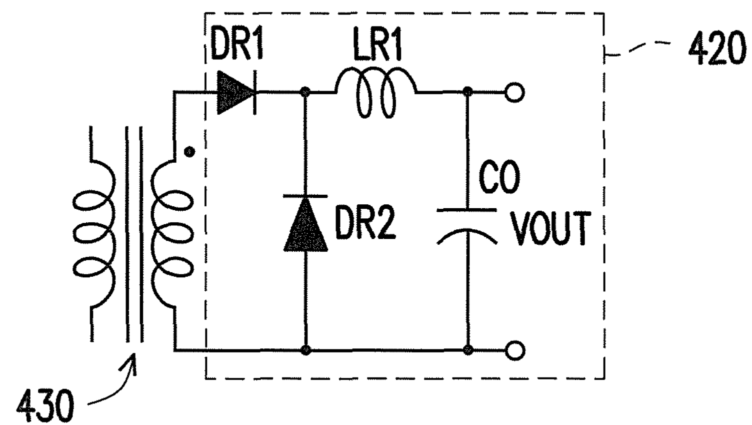
FIG. 6A-FIG. 6D are circuit diagrams of a plurality of implementations of a second side rectifying circuit.

On the other hand, implementation detail of the second side rectifying circuit 420 of the present embodiment is described below. Referring to FIG. 6A-FIG. 6D, FIG. 6A-FIG. 6D are circuit diagrams of a plurality of implementations of the second side rectifying circuit. In FIG. 6A, the second side rectifying circuit 420 includes diodes DR1, DR2, an inductor LR1 and a capacitor CO. An anode of the diode DR1 is coupled to a first terminal of the secondary side of the transformer 430, and an anode of the diode DR2 is coupled to a second terminal of the secondary side of the transformer 430, and cathodes of the diode DR1 and the diode DR2 are coupled to each other. A first terminal of the inductor LR1 is coupled to the cathodes of the diode DR1 and the diode DR2, and a second terminal of the inductor LR1 is coupled to a first terminal of the capacitor CO. Moreover, a second terminal of the capacitor CO is coupled to the anode of the diode DR2, and the output voltage VOUT is provided between the first terminal and the second terminal of the capacitor CO.

Figure 6B:
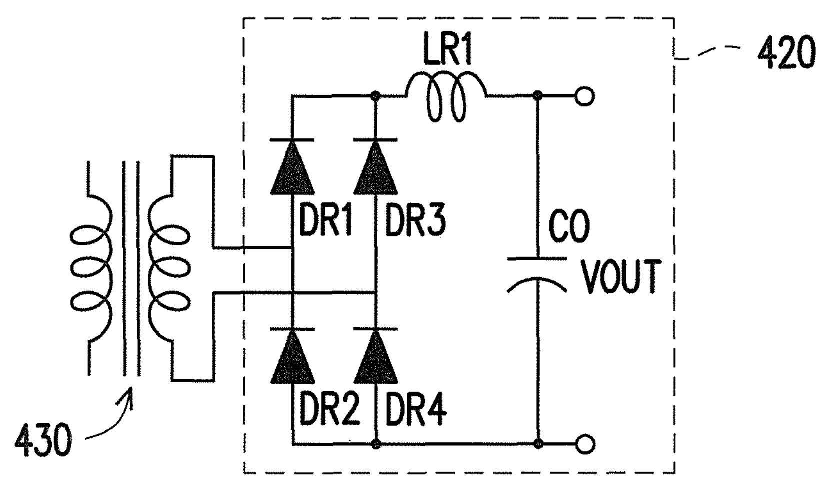

In FIG. 6B, the second side rectifying circuit 420 includes diodes DR1-DR4, an inductor LR1 and a capacitor CO. An anode of the diode DR1 and a cathode of the diode DR2 are coupled to a first terminal of the secondary side of the transformer 430, and an anode of the diode DR3 and a cathode of the diode DR4 are coupled to a second terminal of the secondary side of the transformer 430. Moreover, cathodes of the diode DR1 and the diode DR3 are coupled to each other, and anodes of the diode DR2 and the diode DR4 are coupled to each other. A first terminal of the inductor LR1 is coupled to the cathodes of the diode DR1 and the diode DR3, and the capacitor is coupled between a second terminal of the inductor LR1 and the anodes of the diode DR2 and the diode DR4. The output voltage VOUT is provided between a first terminal and a second terminal of the capacitor CO.

Figure 6C:
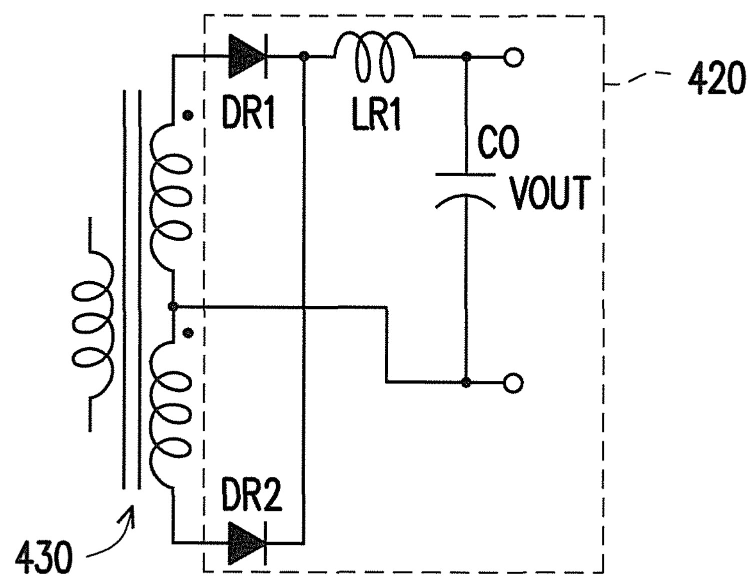

On the other hand, in FIG. 6C, the second side rectifying circuit 420 includes diodes DR1-DR2, an inductor LR1 and a capacitor CO. An anode of the diode DR1 is coupled to the first terminal of the secondary side of the transformer 430, and an anode of the diode DR2 is coupled to the second terminal of the secondary side of the transformer 430. Moreover, cathodes of the diode DR1 and the diode DR2 are commonly coupled to a first terminal of the inductor LR1, and a second terminal of the inductor LR1 is coupled to a first terminal of the capacitor CO. A second terminal of the capacitor CO is coupled to a center-tapped terminal of the secondary side of the transformer 430. The output voltage VOUT is provided between a first terminal and a second terminal of the capacitor CO.

Figure 6D:
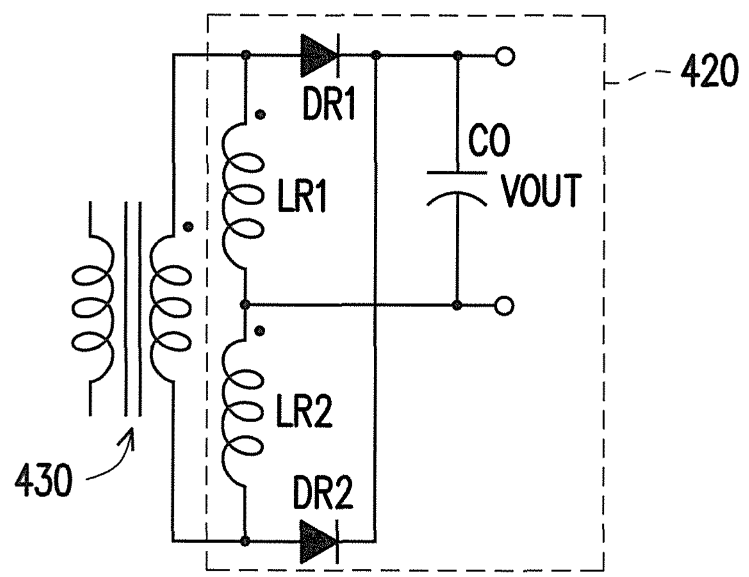

In FIG. 6D, the second side rectifying circuit 420 includes diodes DR1-DR2, inductors LR1, LR2 and a capacitor CO. A first terminal of the inductor LR1 is coupled to the first terminal of the secondary side of the transformer 430, and the inductor LR2 is coupled between a second terminal of the inductor LR1 and the second terminal of the secondary side of the transformer 430. An anode of the diode DR1 is coupled to the first terminal of the inductor LR1, an anode of the diode DR2 is coupled to the second terminal of the secondary side of the transformer 430, and a cathode of the diode DR2 is coupled to a cathode of the diode DR1. The capacitor CO is coupled in series between the cathode of the diode DR1 and the second temiinal of the inductor LR1, and the output voltage VOUT is provided between a first terminal and a second terminal of the capacitor CO.

It should be noted that any one of the aforementioned first side converting circuits 410 and any one of the aforementioned second side rectifying circuits 420 can be combined with each other to Rain the resonant converting circuit 400 of the present embodiment. Certainly, the first side converting circuits 410 and the second side rectifying circuits 420 are not limited to the aforementioned descriptions, and any converting circuit and rectifying circuit known by those skilled in the art can be applied to the invention.

Figure 7:
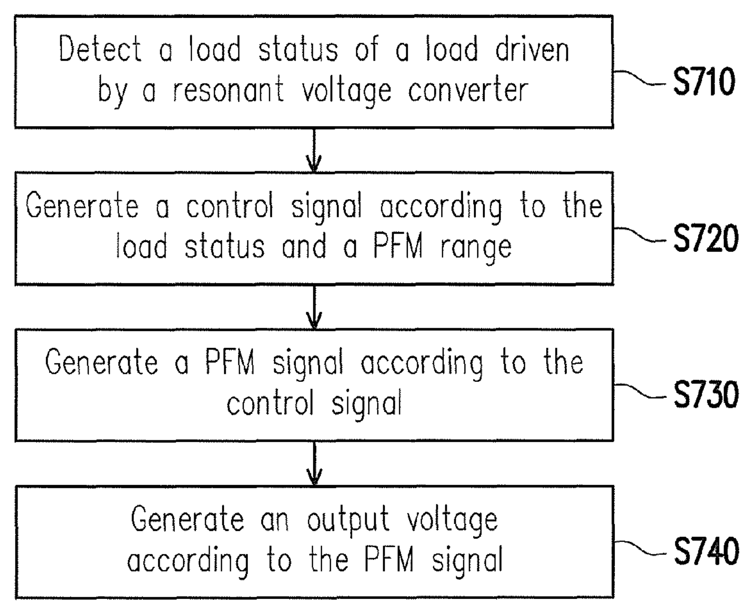
FIG. 7 is a flowchart illustrating a control method of a resonant voltage converter according to an embodiment of the invention.

Referring to FIG. 7, FIG. 7 is a flowchart illustrating a control method of a resonant voltage converter according to an embodiment of the invention. In step S710, a load status of a load driven by the resonant voltage converter is detected. Then, in step S720, a control signal is generated according to the load status and a PFM range. In step S730, a PFM signal is generated according to the control signal, where when the load status is a light load status, the control signal is divided into a plurality of first time periods and a plurality of second time periods according to the PFM range, and the PFM signal holds on a reference voltage during the second time periods, and is a periodical signal having frequency substantially equal to a resonant frequency during the first time periods. Finally, in step S740, an input voltage is converted to generate an output voltage according to the PFM signal.

Implementation details of the aforementioned steps have been described in the aforementioned embodiments, and details thereof are not repeated.

In summary, in the light load status of the resonant converting apparatus of the invention, the control signal used for controlling switching of the switches is divided into a plurality of first time periods and a plurality of second time periods. Moreover, according to the control signal, the PFM signal is the periodical signal having frequency substantially equal to the resonant frequency during the first time periods, and the PFM signal is maintained to the reference voltage during the second time periods. In this way, under the light load status, a switch switching frequency (a frequency of the control signal) of the resonant converting apparatus is not away from the resonant frequency, by which the power conversion efficiency of the resonant converting apparatus under the light load status is effectively maintained.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A resonant converting apparatus, comprising:

a resonant converting circuit, receiving an input voltage, and converting the input voltage to generate an output voltage according to a pulse frequency modulation signal, and the resonant converting circuit providing the output voltage to drive a load;

a load detector, coupled to the resonant converting circuit, and detecting a load status of the load; and a control signal generator, coupled to the load detector and the resonant converting circuit, and generating a control signal according to the load status and a pulse frequency modulation range; and a pulse frequency modulation signal generator, coupled between the control signal generator and the resonant converting circuit, and generating the pulse frequency modulation signal according to the control signal, wherein when the load status is a light load status, the control signal generator divides the control signal into a plurality of first time periods and a plurality of second time periods according to the pulse frequency modulation range, the first time periods and the second time periods are arranged alternatively, and the pulse frequency modulation signal generator keeps the pulse frequency modulation signal at a reference voltage during the second time periods, and sets the pulse frequency modulation signal to a periodical signal having frequency substantially equal to a resonant frequency during the first time periods.

2. The resonant converting apparatus as claimed in claim 1, wherein the control signal generator detects a current demand of the load to obtain the load status.

3. The resonant converting apparatus as claimed in claim 2, wherein the control signal generator adjusts time lengths of the first time periods and the second time periods according to a variation of the current demand when the load status is the light load status.

4. The resonant converting apparatus as claimed in claim 3, wherein the current demand is positively correlated to the time length of each of the first time periods.

5. The resonant converting apparatus as claimed in claim 1, wherein the control signal generator determines the load status to be the light load status when the current demand is smaller than a predetermined threshold.

6. The resonant converting apparatus as claimed in claim 1, wherein the resonant converting circuit comprises:

a first side converting circuit, receiving the input voltage and the pulse frequency modulation signal, and performing a voltage conversion operation to the input voltage based on the pulse frequency modulation signal, and generating a first voltage;

an inductance capacitance resonant circuit, coupled to the first side converting circuit, providing the resonant frequency, and generating a second voltage according to the first voltage;

a transformer, coupled to the inductance capacitance resonant circuit, and having a primary side for receiving the first voltage, and having a secondary side coupled to the primary side for generating a third voltage; and a second side rectifying circuit, coupled to the secondary side of the transformer, and rectifying the third voltage to generate the output voltage.

7. The resonant converting apparatus as claimed in claim 6, wherein the first side converting circuit comprises:

a first switch, having a first terminal, a second terminal and a control terminal, wherein the first terminal of the first switch receives the input voltage, the control terminal of the first switch receives a first pulse frequency modulation signal of the pulse frequency modulation signal, and the second terminal of the first switch is coupled to the inductance capacitance resonant circuit; and a second switch, having a first terminal, a second terminal and a control terminal, wherein the first terminal of the second switch is coupled to the second terminal of the first switch, the control terminal of the second switch receives a second pulse frequency modulation signal of the pulse frequency modulation signal, and the second terminal of the second switch is coupled to a reference ground terminal.

8. The resonant converting apparatus as claimed in claim 7, wherein the first side converting circuit further comprises:

a first capacitor, having a first terminal receiving the input voltage, and a second terminal coupled to the inductance capacitance resonant circuit; and a second capacitor, having a first terminal coupled to the second terminal of the first capacitor, and a second terminal coupled to the reference ground terminal, wherein the first voltage is provided between the second terminal of the first capacitor and the second terminal of the first switch.

9. The resonant converting apparatus as claimed in claim 6, wherein the first side converting circuit comprises:

a first switch, having a first terminal, a second terminal and a control terminal, wherein the first terminal of the first switch receives the input voltage, the control terminal of the first switch receives a first pulse frequency modulation signal of the pulse frequency modulation signal, and the second terminal of the first switch is coupled to the inductance capacitance resonant circuit;

a first diode, having a cathode coupled to the first terminal of the first switch;

a second switch, having a first terminal, a second terminal and a control terminal, wherein the first terminal of the second switch is coupled to an anode of the first diode and the inductance capacitance resonant circuit, the control terminal of the second switch receives a second pulse frequency modulation signal of the pulse frequency modulation signal, and the second terminal of the second switch is coupled to a reference ground terminal; and a second diode, having a cathode coupled to the second terminal of the first switch, and an anode coupled to the reference ground terminal, wherein the first voltage is provided between the second terminal of the first switch and the first terminal of the second switch.

10. The resonant converting apparatus as claimed in claim 6, wherein the first side converting circuit comprises:

a first switch, having a first terminal, a second terminal and a control terminal, wherein the first terminal of the first switch receives the input voltage, the control terminal of the first switch receives a first pulse frequency modulation signal of the pulse frequency modulation signal, and the second terminal of the first switch is coupled to the inductance capacitance resonant circuit;

a second switch, having a first terminal, a second terminal and a control terminal, wherein the first terminal of the second switch is coupled to the second terminal of the first switch, the control terminal of the second switch receives a second pulse frequency modulation signal of the pulse frequency modulation signal, and the second terminal of the second switch is coupled to a reference ground terminal;

a third switch, having a first terminal, a second terminal and a control terminal, wherein the first terminal of the third switch receives the input voltage, the second terminal of the third switch is coupled to the inductance capacitance resonant circuit, and the control terminal of the third switch receives the second pulse frequency modulation signal; and a fourth switch, having a first terminal, a second terminal and a control terminal, wherein the first terminal of the fourth switch is coupled to the second terminal of the third switch, the control terminal of the fourth switch receives the first pulse frequency modulation signal, and the second terminal of the fourth switch is coupled to the reference ground voltage, wherein the first voltage is provided between the second terminal of the first switch and the second terminal of the third switch.

11. The resonant converting apparatus as claimed in claim 6, wherein the second side rectifying circuit comprises:

a first diode, having an anode coupled to a first terminal of the secondary side;

a second diode, having an anode coupled to a second terminal of the secondary side, and a cathode coupled to a cathode of the first diode;

an inductor, having a first terminal coupled to the cathode of the first diode; and a capacitor, coupled between a second terminal of the inductor and the second terminal of the secondary side.

12. The resonant converting apparatus as claimed in claim 6, wherein the second side rectifying circuit comprises:

a first diode, having an anode coupled to a first terminal of the secondary side;

a second diode, having an anode coupled to a second terminal of the secondary side, and a cathode coupled to a cathode of the first diode;

an inductor, having a first terminal coupled to the cathode of the first diode; and a capacitor, coupled between a second terminal of the inductor and a center-tapped terminal the secondary side.

13. The resonant converting apparatus as claimed in claim 6, wherein the second side rectifying circuit comprises:

a first diode, having an anode coupled to a first terminal of the secondary side;

a second diode, having an anode coupled to a second terminal of the secondary side, and a cathode coupled to a cathode of the first diode;

a third diode, having a cathode coupled to the first terminal of the secondary side, and an anode coupled to a reference ground terminal;

a fourth diode, having a cathode coupled to the second terminal of the secondary side, and an anode coupled to the reference ground terminal;

an inductor, having a first terminal coupled to the cathodes of the first diode and the second diode; and a capacitor, coupled in series between the second terminal of the inductor and the reference ground terminal.

14. The resonant converting apparatus as claimed in claim 6, wherein the second side rectifying circuit comprises:

a first inductor, having a first terminal coupled to a first terminal of the secondary side;

a second inductor, coupled between a second terminal of the first inductor and a second terminal of the secondary side;

a first diode, having an anode coupled to the first terminal of the first inductor;

a second diode, having an anode coupled to the second terminal of the secondary side, and a cathode coupled to a cathode of the first diode; and a capacitor, coupled in series between the cathode of the first diode and the second terminal of the first inductor.

15. A control method of a resonant voltage converter, comprising:

detecting a load status of a load driven by the resonant voltage converter;

generating a control signal according to the load status and a pulse frequency modulation range;

generating a pulse frequency modulation signal according to the control signal, wherein when the load status is a light load status, the control signal is divided into a plurality of first time periods and a plurality of second time periods according to the pulse frequency modulation range, and the first time periods and the second time periods are arranged alternatively, and the pulse frequency modulation signal is held on a reference voltage during the second time periods, and is a periodical signal having frequency substantially equal to a resonant frequency during the first time periods; and converting an input voltage to generate an output voltage according to the pulse frequency modulation signal.

16. The control method of the resonant voltage converter as claimed in claim 15, wherein the step of detecting the load status of the load driven by the resonant voltage converter comprises:

detecting a current demand of the load to obtain the load status.

17. The control method of the resonant voltage converter as claimed in claim 16, wherein the step of detecting the load status of the load driven by the resonant voltage converter further comprises:

determining the load status to be the light load status when the current demand is smaller than a predetermined threshold.

18. The control method of the resonant voltage converter as claimed in claim 17, wherein the current demand is positively correlated to a time length of the first time period.

19. The control method of the resonant voltage converter as claimed in claim 16, further comprising:

adjusting time lengths of the first time periods and the second time periods according to a variation of the current demand when the load status is the light load status.

* * * * *